United States Patent [19]

Merriam

[11] Patent Number: 4,755,292
[45] Date of Patent: Jul. 5, 1988

[54] PORTABLE ULTRAVIOLET WATER STERILIZER

[76] Inventor: Theodore D. Merriam, 155 Gleason Lake Rd., #404, Wayzata, Minn. 55391

[21] Appl. No.: 895,152

[22] Filed: Aug. 11, 1986

[51] Int. Cl.⁴ .............................................. C02F 1/32
[52] U.S. Cl. .................... 210/192; 210/244; 250/432 R
[58] Field of Search ............... 210/192, 244, 748; 250/428, 432 R; 422/24, 300

[56] References Cited

U.S. PATENT DOCUMENTS

| 839,805 | 1/1907 | Bacon | 422/300 |
|---|---|---|---|
| 1,473,095 | 11/1923 | Henri et al. | |
| 1,961,700 | 6/1934 | Moehler | 167/3 |
| 2,245,762 | 6/1941 | DeStefani et al. | 422/24 |
| 2,470,806 | 5/1949 | Del Cueto | 219/43 |
| 3,478,758 | 11/1969 | Davies | 422/24 |
| 3,498,457 | 3/1970 | Gough | 210/244 |
| 3,500,041 | 3/1970 | Kassing | 422/24 |
| 3,589,862 | 6/1971 | Veloz | 422/24 |
| 3,694,651 | 9/1972 | Glasson | 250/428 |
| 3,971,947 | 7/1976 | Lambert et al. | 422/24 |
| 4,296,328 | 10/1981 | Regan | 250/432 R |
| 4,433,244 | 2/1984 | Hogan | 250/455.1 |
| 4,448,750 | 5/1984 | Fuesting | 422/20 |

FOREIGN PATENT DOCUMENTS 259734 1/1965 Australia .
2251520 7/1975 France .................. 422/24

OTHER PUBLICATIONS

"Water Sterilization Unit UA-C 13", D. Kuse, Baden, Brown Boveri Rev. 1-79, pp. 34-36.
Russel's Catalog, A Frontier Holdings Inc. Company, Early Spring 1983.

Primary Examiner—Richard V. Fisher
Assistant Examiner—Linda Evans
Attorney, Agent, or Firm—Orrin M. Haugen; Thomas J. Nikolai; Frederick W. Niebuhr

[57] ABSTRACT

A portable container providing a means for the sterilization of drinking water by ultraviolet radiation. The container has a bottom housing serving as a reservoir for holding the water and a mating top housing containing the ultraviolet source. Powered by batteries the ultraviolet source provides efficient sterilization throughout the reservoir, the reservoir preferably having ultraviolet reflecting sidewalls.

5 Claims, 1 Drawing Sheet

PORTABLE ULTRAVIOLET WATER STERILIZER

BACKGROUND OF THE INVENTION

This invention relates to the treatment and sterilization of liquids by means of ultraviolet radiation. More particularly, the invention provides a novel apparatus for irradiating drinking water to kill microorganisms commonly found in water supplies which cause sickness in human beings.

Contaminated water is a major cause of sicknesses that often plague travelers to foreign countries. Microorganisms in the water supply are also a concern for backpackers, hikes, and campers who are away from drinking water supplied by modern water treatment facilities. The microorganism which is the major cause of stomach disorders in travelers is coliform bacteria.

It is known that ultraviolet radiation can be used to kill organic contamination within water supplies. U.S. Pat. No. 1,473,095 to Henri et al discloses an apparatus for sterilizing liquids by means of ultraviolet rays. In the patent water is passed through quartz tubes in proximity to an ultraviolet source to sterilize the water by making it free of living microorganisms. Other apparatus have been developed for the sterilization of drinking glasses such as U.S. Pat. No. 1,961,700 to Moehler; and for sterilization of medical or dental equipment such as found in U.S. Pat. No. 4,448,750 to Fuesting.

In spite of the general knowledge of UV sterilization of drinking water, the technique heretonow has been applied mainly in dedicated water supply systems for community use or in laboratory settings. The need for a UV source which can be safely employed in a portable personalized water sterilizer has remained unsatisfied.

SUMMARY OF THE INVENTION

The present invention is a portable UV water sterilizer which can be taken anywhere by travelers to provide a means of eradicating harmful microorganisms in drinking water. The unit is small, holding in the range of 10–30 ozs. of water in a lid containing an ultraviolet lamp powered by batteries. Activation of the ultraviolet source produces radiation with a wavelength of approximately 254 nanometers. The shape of the reservoior allows the ultraviolet radiation to penetrate throughout the reservoir sterilizing virtually all living microorganisms in just a few minutes. The sterilizing apparatus is adaptable for use with timers and signal lights to indicate the completion of the sterilization cycle. Additionally, the shape of the reservoir permits the emptying of the sterilized liquid from the container while leaving sediments behind.

BRIEF DESCRIPTION OF THE DRAWINGS

A detailed description of one preferred embodiment of the PORTABLE UV WATER STERILIZER is hereafter described with specific reference being made to the drawings in which.

DETAILED DESCRIPTION OF THE PREFERRED EMBODIMENT

Figure 1:
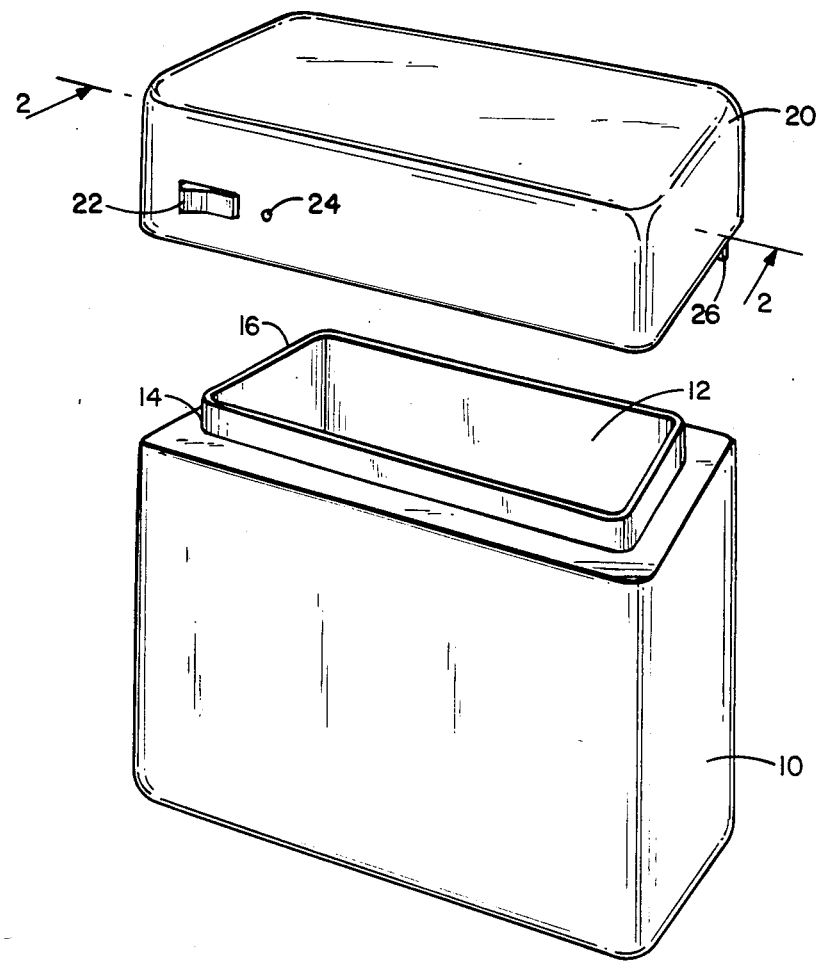
FIG. 1 is a perspective view of the present invention.

Referring to the drawings, FIG. 1 shows a bottom housing 10 forming a reservoir 12 for the containment of a liquid. The bottom housing 10 is on the order of 4½ inches (11.4 cm) high by 6½ inches (16.5 cm) long by 2 inches (5 cm) wide. The size permits the reservoir to hold approximately 20 ozs. (600 ml) of water. The bottom housing 10 can be made of plastic or other material and has radiused outer edges to provide ease of grasping and handling.

Adapted to mate with the bottom housing is the top housing or lid 20 which contains the ultraviolet source and the control unit and associated power supply. Shown in FIG. 1 is the on/off switch 22, indicator light 24 and safety inter-lock 26.

Figure 2:
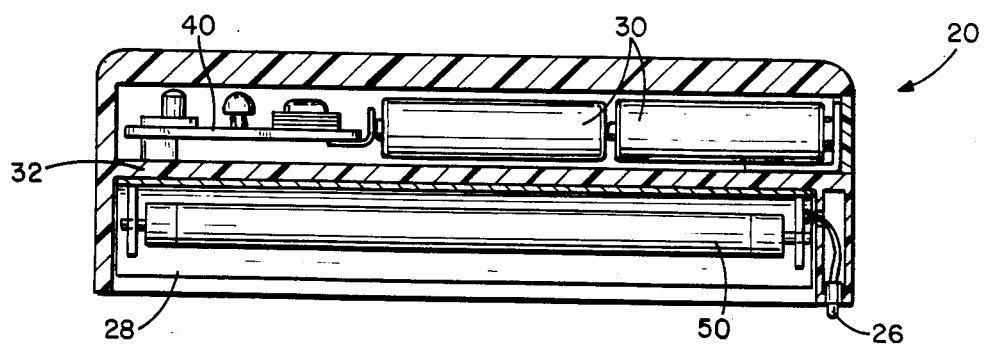
FIG. 2 is a cross-sectional view of the top housing of the apparatus shown in FIG. 1.

FIG. 2 is a cross-sectional view of the top housing or lid as shown in FIG. 1. In the preferred embodiment being disclosed, power to the ultraviolet bulb is provided by 4 AA batteries, two of which are shown in the figure as numeral 30. On/off switch 22, shown in FIG. 1, activates circuit board 40. Contained on circuit board 40 are various resistors, capacitors, a transistor and a transformer. When activated the electronic circuit creates a voltage sufficient to ignite UV lamp 50 and subsequently sustain its operation.

The circuitry contained within the top housing 20 is generally known in the art and is the type used to energize fluorescent lamps. The one employed in the present invention is that of Transistorized Super-Mini Fluorescent Flashlight manufactured by JML Model No. 1195 having a UK Registration Design No. 983,626. Various equivalents by different manufacturers are readily available.

Lamp 50 as shown in FIG. 2 is a custom mercury ultraviolet lamp from UVP, Inc. P.O. Box 1501 San Gabriel, Calif. 91778. The lamp is a 6" atmospheric pressure ultraviolet lamp having a quartz envelope. Lamp 50 fits in lamp holder 32 and is electrically connected to circuit board 40. During operation, the lamp has an output of approximately 4 watts and a wavelength spectral output peak of 254 nanometers. Alternatively, various ultraviolet germicidal lamps may be employed from various manufacturers including General Electric Corporation of Schenectady, N.Y. As seen from FIG. 2, lamp 50, batteries 30 and circuit board 40 are recessed within top housing 20 to position these components entirely above bottom housing 10 when housings 10 and 20 are engaged.

To aid in the rapid sterilization of the liquid contained in the reservoir, a reflector 28 may be employed in the top housing to direct the ultraviolet radiation from the back side of the bulb towards the reservoir.

For best operation and efficient distribution of the ultraviolet rays, the walls 14 of the reservoir opening 12 are coated with a material which reflects ultraviolet radiation. Alternatively, a separate container shown in FIG. 1 as numeral 16 can be inserted into the reservoir opening 12 and contiguous with walls 14. If the reservoir insert 16 is made of a reflective material such as smooth aluminum or stainless steel, the walls of the insert will reflect the ultraviolet rays and provide an even and efficient distribution of the ultraviolet radiation. The use of insert 16 provides a lightweight container for filling with water to be sterilized and allows the water to be poured out leaving the sediments behind.

Since direct exposure to ultraviolet radiation can be harmful to the operator, a safety inter-lock switch 26 is applied to deactivate the ultraviolet lamp if the top housing 20 is removed from the lower housing 10.

Top housing 20 is designed to mate with the lower housing to provide a light-tight seal between the top and bottom housings to prevent escape of ultraviolet radiation. The top housing may be hinged, snap-on, or frictionally fit upon the bottom housing 10.

Testing of a prototype unit showed that the total coliform bacteria count from a sample of lake water having an initial coliform bacteria content too numerous to count, was reduced to a coliform bacteria count of 1 per 50 milliliters, after being subjected to ultraviolet radiation within the prototype unit for one minute. After three minutes of ultraviolet radiation, the total coliform bacteria was less than 1 per 50 milliliters.

A control unit for the portable UV water sterilizer may contain a timer circuit which shuts off the unit upon the elapse of a predetermined time of ultraviolet exposure. Alternately, a dosage meter could be incorporated into the control unit to end the ultraviolet radiation after the accumulation of a predetermined dosage. As shown in FIG. 1, indicator light 24 is used to indicate when the lamp is lit. The indicator lamp may be a seprate bulb, an LED, or an optical fiber leading from the UV lamp itself.

It will, of course, be understood that various changes may be made in the form, details, arrangement and proportions of the parts without departing from the scope of the invention which consists of the matter shown and described herein and set forth in the appended claims.

What is claimed is:

1. A portable apparatus for exposing liquid to ultraviolet radiation comprising:
   a housing including a bottom portion having an inside surface forming a reservoir, a reflective, rigid and liquid impermeable container for said liquid, substantially conforming to the shape of the reservoir, removably insertable into the reservoir, and contiguous with at least the majority of said inside surface when so inserted;
   a unitary top portion of said housing removably mated to the bottom portion and providing a substantially light-tight cover over the reservoir; and
   means defining an ultraviolet radiation source for providing ultraviolet radiation to the reservoir mounted with respect to said top portion and contained within said top portion entirely above said bottom portion, and a power supply means contained within said housing for providing power to said radiation source.

2. The apparatus of claim 1 wherein the power supply means comprises a plurality of batteries.

3. The apparatus of claim 1 wherein the reflective container is constructed of aluminum.

4. The apparatus of claim 1 wherein the top portion of the housing contains a reflector to direct the ultraviolet radiation into the reservoir.

5. The apparatus of claim 1 wherein the ultraviolet radiation source is a mercury lamp having a spectral output wavelength near 254 nanometers.

* * * * *